United States Patent
Wolf et al.

(10) Patent No.: US 9,080,010 B2
(45) Date of Patent: *Jul. 14, 2015

(54) PROCESS FOR PREPARING POLYETHER CARBONATE POLYOLS WITH DOUBLE METAL CYANIDE CATALYSTS AND IN THE PRESENCE OF METAL SALTS

(75) Inventors: Aurel Wolf, Wülfrath (DE); Stefan Grasser, Leverkusen (DE); Christoph Gürtler, Köln (DE); Jörg Hofmann, Krefeld (DE)

(73) Assignee: Bayer Intellectual Property GmbH, Monheim (DE)

( * ) Notice: Subject to any disclaimer, the term of this patent is extended or adjusted under 35 U.S.C. 154(b) by 201 days.

This patent is subject to a terminal disclaimer.

(21) Appl. No.: 13/579,222

(22) PCT Filed: Feb. 17, 2011

(86) PCT No.: PCT/EP2011/052337
§ 371 (c)(1),
(2), (4) Date: Nov. 2, 2012

(87) PCT Pub. No.: WO2011/101403
PCT Pub. Date: Aug. 25, 2011

(65) Prior Publication Data
US 2013/0190462 A1    Jul. 25, 2013

(30) Foreign Application Priority Data
Feb. 18, 2010 (DE) .................. 10 2010 008 410

(51) Int. Cl.
*C08G 65/04* (2006.01)
*C08G 64/34* (2006.01)
*C08G 18/44* (2006.01)
*C08G 65/26* (2006.01)
*C08G 64/20* (2006.01)
*C08G 18/32* (2006.01)

(52) U.S. Cl.
CPC ............. *C08G 64/34* (2013.01); *C08G 18/44* (2013.01); *C08G 64/205* (2013.01); *C08G 65/2603* (2013.01); *C08G 65/2663* (2013.01); *C08G 65/2696* (2013.01); *C08G 18/32* (2013.01)

(58) Field of Classification Search
CPC ...... C08G 18/44; C08G 18/32; C08G 65/2663
USPC .......... 528/408, 403, 412, 414, 428; 568/672, 568/678, 679, 680
See application file for complete search history.

(56) References Cited

U.S. PATENT DOCUMENTS

| | | | |
|---|---|---|---|
| 3,404,109 | A | 10/1968 | Milgrom |
| 3,829,505 | A | 8/1974 | Herold |
| 3,941,849 | A | 3/1976 | Herold |
| 5,158,922 | A | 10/1992 | Hinney et al. |
| 5,470,813 | A | 11/1995 | Le-Khac |
| 6,780,813 | B1 | 8/2004 | Hofmann et al. |
| 7,008,900 | B1 | 3/2006 | Hofmann et al. |
| 2005/0027145 | A1 | 2/2005 | Hofmann et al. |
| 2006/0223972 | A1* | 10/2006 | Hinz et al. ............. 528/196 |
| 2006/0223979 | A1* | 10/2006 | Ostrowski et al. ...... 528/425 |
| 2010/0048935 | A1* | 2/2010 | Mijolovic et al. ...... 558/276 |

FOREIGN PATENT DOCUMENTS

| | | |
|---|---|---|
| EP | 0090445 A2 | 10/1983 |
| EP | 0 222 453 A2 | 5/1987 |
| EP | 0700949 A2 | 3/1996 |
| EP | 0743093 A1 | 11/1996 |
| EP | 0761708 A2 | 3/1997 |
| JP | 4145123 A | 5/1992 |
| WO | WO-97/40086 A1 | 10/1997 |
| WO | WO-98/16310 A1 | 4/1998 |
| WO | WO-99/48607 A1 | 9/1999 |
| WO | WO-00/47649 A1 | 8/2000 |
| WO | WO-01/39883 A1 | 6/2001 |
| WO | WO-01/80994 A1 | 11/2001 |
| WO | WO-03/029240 A1 | 4/2003 |
| WO | WO-2004081082 A1 | 9/2004 |
| WO | WO-2006103212 A1 | 10/2006 |
| WO | WO-2008024363 A2 | 2/2008 |

OTHER PUBLICATIONS

Translation of the International Preliminary Report on Patentability for PCT/EP2011/052337 dated Aug. 21, 2012.
International Search Report for PCT/EP2011/052337 mailed Apr. 4, 2011.

* cited by examiner

*Primary Examiner* — Gregory Listvoyb
(74) *Attorney, Agent, or Firm* — Drinker Biddle & Reath LLP

(57) ABSTRACT

The present invention relates to a process for the preparation of polyether carbonate polyols by catalytic copolymerization of carbon dioxide ($CO_2$) with alkylene oxides in the presence of one or more H-functional starter substances with the aid of double metal cyanide (DMC) catalysts and in the presence of metal salts.

13 Claims, No Drawings

PROCESS FOR PREPARING POLYETHER CARBONATE POLYOLS WITH DOUBLE METAL CYANIDE CATALYSTS AND IN THE PRESENCE OF METAL SALTS

CROSS-REFERENCE TO RELATED APPLICATIONS

This application is a national stage application (under 35 U.S.C. §371) of PCT/EP2011/052337, filed Feb. 17, 2011, which claims benefit of German Application No. 10 2010 008 410.7, filed Feb. 18, 2010, both of which are incorporated herein by reference in their entirety.

The present invention relates to a process for the preparation of polyether carbonate polyols by catalytic copolymerisation of carbon dioxide ($CO_2$) with alkylene oxides in the presence of one or more H-functional starter substances with the aid of double metal cyanide (DMC) catalysts and in the presence of metal salts.

The preparation of polyether carbonate polyols by catalytic addition of alkylene oxides (epoxides) and carbon dioxide to H-functional starter substances (starters) has been the subject of intensive research for more than 40 years (Inoue et al., Copolymerization of Carbon Dioxide and Epoxide with Organometallic Compounds; Die Makromolekulare Chemie 130, 210-220, 1969). This reaction is shown schematically in scheme (I), wherein R represents an organic radical such as alkyl, alkylaryl or aryl, each of which can also contain heteroatoms such as, for example, O, S, Si, etc., and wherein e and f represent an integer, and wherein the product shown here in scheme (I) for the polyether carbonate polyol is simply to be so understood that blocks having the structure shown can in principle be found in the resulting polyether carbonate polyol but the sequence, number and length of the blocks as well as the OH functionality of the starter can vary and is not limited to the polyether carbonate polyol shown in scheme (I). This reaction (see scheme (I)) is ecologically very advantageous because this reaction represents the conversion of a greenhouse gas such as $CO_2$ into a polymer. The cyclic carbonate (for example for R=$CH_3$ propylene carbonate) shown in formula (I) is formed as a further product.

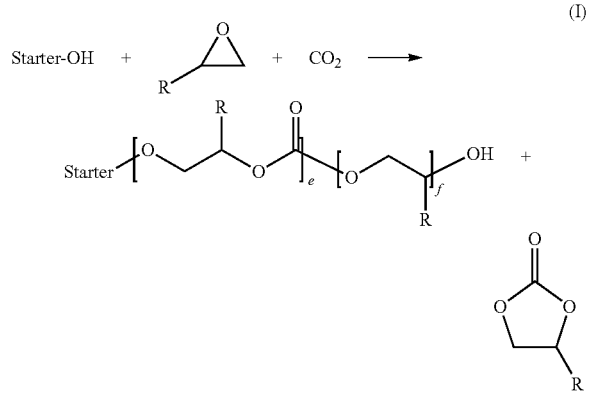

Activation within the scope of the invention denotes a step in which a partial amount of alkylene oxide compound, optionally in the presence of $CO_2$, is added to the DMC catalyst and optionally to the metal salt, and then the addition of the alkylene oxide compound is interrupted, a temperature peak ("hotspot") and/or a pressure drop being observed in the reactor as a result of a subsequent exothermic chemical reaction. The process step of activation is the period of time from the addition of the partial amount of alkylene oxide compound, optionally in the presence of $CO_2$, to the DMC catalyst to the occurrence of the hotspot. In general, the activation step can be preceded by a step for drying the DMC catalyst and optionally the starter by elevated temperature and/or reduced pressure, this step of drying not being part of the activation step within the scope of the present invention.

EP-A 0 222 453 describes the preparation of polyether carbonate polyols using a DMC catalyst in conjunction with a co-catalyst at temperatures of from 40 to 200° C. and in a pressure range from 2 to 40 bar absolute, two groups being listed as co-catalyst: (a) one or more salts consisting of at least divalent metal ions and metal-free anions which have a solubility in water of at least 1 g/100 ml at 25° C. and (b) one or more non-metal-containing acids whose 0.1 normal aqueous solution in water at 25° C. has a pH value of 3 or less. The preferred co-catalyst is zinc sulfate and zinc sulfate hydrate. The co-catalyst is either introduced separately into the reactor or, preferably, added to the suspension during the preparation of the catalyst. The co-catalysts are present relative to the DMC catalyst in a molar ratio of from 10 to 0.1 and preferably in the range from 4 to 0.2. In the process according to EP-A 0 222 453, up to 60 wt. % epoxide (relative to the starter) are placed in the reaction vessel for activating the catalyst. The process yields significantly high amounts of the secondary product propylene carbonate (between 22.5 and 31 wt. %). Accordingly, this process exhibits too high an amount of epoxide in the activation step from the safety point of view and a disadvantageous selectivity.

In the article by J. Kuyper et al. in Journal of Catalysis 1987, Vol. 105, pages 163-174, hexacyanocobaltate-based systems $Zn_2[Co(CN)_6](OH)$, formed from $Zn_3[Co(CN)_6]_2$ and $Zn(OH)_2$, as well as inorganic co-catalysts for those systems are disclosed. $Zn_2[Co(CN)_6](OH)$ is here a precursor, which is reacted with co-catalysts such as acids or sulfates before the newly formed catalyst is used for the homopolymerisation of epoxides (excluding carbon dioxide). These co-catalysts increase the stability of the catalysts used in the homopolymerisation of epoxides. The use for the copolymerisation of epoxides with $CO_2$ is not mentioned.

WO-A 99/48607 discloses DMC catalysts which are modified with cyanide-free compounds of the elements of group IIA of the periodic system and their use in the homopolymerisation of epoxides, polyether polyols having low contents of unsaturated bonds and/or high molecular weights being obtained. The counter-ion to the cation from group IIa has no technical effect according to the disclosure of WO-A 99/48607. In all the described catalysts, the compound with an element of group IIA is added in the preparation of the DMC catalyst. However, the separate addition of DMC catalyst and the compound of an element of group IIA is not described in WO-A 99/48607.

It was, therefore, an object of the present invention to provide a process for the preparation of polyether carbonate polyols which both results in a high content of incorporated $CO_2$ and at the same time has advantageous selectivity (i.e. low ratio of cyclic carbonate to linear polyether carbonate).

Surprisingly, it has been found that a high content of incorporated $CO_2$ and at the same time advantageous selectivity (i.e. low ratio of cyclic carbonate to linear polyether carbonate) is achieved by a process for the preparation of polyether carbonate polyols from one or more H-functional starter substances, one or more alkylene oxides and carbon dioxide in the presence of a DMC catalyst and in the presence of at least one metal salt, characterised in that (α) the H-functional starter substance, or a mixture of at least two H-functional starter substances, is placed in a reaction vessel and water and/or other readily volatile compounds are optionally removed by elevated temperature and/or reduced pressure ("drying"), wherein the DMC catalyst and/or the metal salt is added to the H-functional starter substance, or to the mixture of at least two H-functional starter substances, before or after the drying, (β) for activation, a partial amount (based on the total amount of the amount of alkylene oxides used in the activation and copolymerisation) of one or more alkylene oxides is added to the mixture resulting from step (α), wherein this addition of a partial amount of alkylene oxide can optionally take place in the presence of $CO_2$ and wherein a waiting period is then observed until the temperature peak ("hotspot") that occurs as a result of the subsequent exothermic chemical reaction, and/or a pressure drop in the reactor occurs, and wherein step (β) for activation can also be carried out several times, (γ) one or more alkylene oxides and carbon dioxide are added to the mixture resulting from step (β) ("copolymerisation"), wherein the alkylene oxides used for the copolymerisation can be the same as or different from the alkylene oxides used in the activation, wherein there is used as the metal salt at least one compound selected from the group consisting of alkaline earth halides, alkaline earth carboxylates and aluminium carboxylates.

In a preferred embodiment there is used as the metal salt in the process according to the invention magnesium halide in an amount of from 0.8 to 4.0 [mmol metal salt]/[mmol Co] (such as, for example, magnesium chloride), alkaline earth carboxylate and/or aluminium carboxylate, in particular magnesium carboxylate (such as, for example, magnesium acetate, magnesium stearate), calcium carboxylate (such as, for example, calcium stearate) and/or aluminium carboxylate (such as, for example, aluminium stearate). This has the technical effect that the process according to the invention, in addition to having a high content of incorporated $CO_2$ in the resulting polyether carbonate polyol and advantageous selectivity, also has a short activation time.

In a particularly preferred embodiment there is used as the metal salt in the process according to the invention calcium carboxylate (such as, for example, calcium stearate). This has the technical effect that the process according to the invention, in addition to having a high content of incorporated $CO_2$ in the resulting polyether carbonate polyol, advantageous selectivity and a short activation time, also has a low level of polydispersity of the resulting polyether polyol carbonate.

The indication of the amount of metal salt used is based on the ratio of the amount of the metal salt used, or the sum of the amounts of the metal salts used, to the amount of cobalt used originating from the DMC catalyst (indicated as [mmol metal salt]/[mmol Co]).

Alkaline earth metals within the scope of the invention are the elements of group 2 of the periodic system of the elements and include the elements beryllium (Be), magnesium (Mg), calcium (Ca), strontium (Sr), barium (Ba) and radium (Ra).

Halides are the anions of the elements of group 17 of the periodic system of the elements and include the anions fluoride, chloride, bromide, iodide and astatide.

Carboxylates within the scope of this invention are anions of carboxylic acids which contain at least one carboxylate group.

The carboxylates have, for example, only one carboxylate group according to formula (II)

$$R^1\text{—COO}^- \tag{II}$$

wherein $R^1$ represents H, $C_1$- to $C_{30}$-alkyl (such as, for example, $CH_3$, $CH_3\text{—}CH_2$, $CH_3\text{—}CH_2\text{—}CH_2$, $CH_3\text{—}(CH_2)_3$, $CH_3\text{—}(CH_2)_4$, $CH_3\text{—}(CH_2)_5$, $CH_3\text{—}(CH_2)_6$, $CH_3\text{—}(CH_2)_7$, $CH_3\text{—}(CH_2)_8$, $CH_3\text{—}(CH_2)_{14}$, $CH_3\text{—}(CH_2)_{16}$ and their branched isomers), $C_7$- to $C_{30}$-alkaryl (such as, for example, benzyl) or $C_6$- to $C_{30}$-aryl (such as, for example, phenyl or naphthyl).

The carboxylates can likewise be unsaturated carboxylates, such as, for example, acrylate, methacrylate and unsaturated fatty acid salts such as oleate (salt of oleic acid) where $R^1$=$CH_3\text{—}(CH_2)_7\text{—}CH$=$CH\text{—}(CH_2)_7$, linolate (salt of linoleic acid) where $R^1$=$CH_3\text{—}(CH_2)_4\text{—}CH$=$CH\text{—}CH_2\text{—}CH$=$CH\text{—}(CH_2)_7$ as well as linolenate (salt of linolenic acid) where $R^1$=$CH_3\text{—}CH_2\text{—}CH$=$CH\text{—}CH_2\text{—}CH$=$CH\text{—}CH_2\text{—}CH$=$CH\text{—}(CH_2)_7$.

$R^1$ in formula (II) can also be heteroaromatic as in the case of nicotinoate, for example.

The carboxylates can also have, for example, two carboxylate groups according to formula (III)

$$^-\text{OOC—}R^2\text{—COO}^- \tag{III}$$

wherein $R^2$ represents a single bond (in the case of oxalate), $C_1$- to $C_{30}$-alkylene (such as, for example, $CH_2$, $CH_2\text{—}CH_2$, $(CH_2)_3$, $(CH_2)_4$, $(CH_2)_5$, $(CH_2)_6$, $(CH_2)_7$, —CH=CH— (in the case of maleate or fumarate), $C_7$- to $C_{30}$-alkaryl (such as, for example, benzyl) or $C_6$- to $C_{30}$-aryl (such as, for example, phenyl or naphthyl).

The carboxylates can additionally be substituted by heteroatoms (such as, for example, halogens such as fluorine, chlorine, bromine, iodine) and/or by one or more functional groups such as hydroxyl (—OH), amine (primary amino group —$NH_2$, secondary amino group —NH or tertiary amino group —N) or thiol (—SH). Examples of such carboxylates are the salts of the hydroxycarboxylic acids such as glycolate (salt of glycolic acid), lactate (salt of lactic acid), tartrate (salt of tartaric acid), salicylate (salt of salicylic acid). Further examples are the salts of the amino acids such as the salts of alanine, asparagine, aspartic acid, cysteine, glutamine, glutamic acid, glycine, histidine, isoleucine, leucine, lysine, methionine, phenylalanine, proline, serine, threonine, tryptophan, tyrosine and valine. Further examples are the salts of the carboxylic acids with a thiol group such as, for example, the salts of 2-mercaptopropionic acid. Examples of carboxylates with two functional groups are the salts of cysteine (containing an amino group and a thiol group).

In general, the metal salts can be used in a total amount of from 0.2 to 10.0 [mmol metal salt]/[mmol Co]. Preferably, the metal salts are used in a total amount of from 0.8 to 4.0 [mmol metal salt]/[mmol Co], particularly preferably in a total amount of from 1.2 to 3.0 [mmol metal salt]/[mmol Co].

Step (α):

For the preparation of polyether carbonate polyols by catalytic addition of alkylene oxides (epoxides) and carbon dioxide to H-functional starter substances (starters) in the presence of the DMC catalysts according to the invention and one or more metal salts, the H-functional starter substance, or a mixture of at least two H-functional starter substances, is placed in a reaction vessel. Optionally in step (α)

(α1) the H-functional starter substance, or a mixture of at least two H-functional starter substances, is placed in a reaction vessel and (α2) the temperature of the starter substance or of the mixture is brought to from 50 to 200° C., preferably from 80 to 160° C., particularly preferably from 100 to 140° C., and/or the pressure in the reactor is reduced to less than 500 mbar, preferably from 5 mbar to 100 mbar. A stream of nitrogen can also be passed through the reactor.

The double metal cyanide catalyst can be added to the H-functional starter substance, or to the mixture of at least two H-functional starter substances, in step (α1) or immediately thereafter in step (α2).

The DMC catalyst can be added in solid form or in the form of a suspension in an H-functional starter substance. If the catalyst is added in the form of a suspension, it is preferably added to the H-functional starter substance(s) in step (α1).

Step (β):

The activation (β) is preferably carried out in such a manner that (β1) in a first activation step, a first partial amount (based on the total amount of the amount of alkylene oxides used in the activation and copolymerisation) of one or more alkylene oxides is added to the mixture resulting from step (α), wherein this addition of the partial amount of alkylene oxide can optionally take place in the presence of $CO_2$ but preferably takes place in the absence of $CO_2$, and wherein a waiting period is then observed until the temperature peak ("hotspot") that occurs as a result of the subsequent exothermic chemical reaction, and/or a pressure drop in the reactor occurs, (β2) in a second activation step, after the temperature peak reached in the preceding activation step, a second partial amount (based on the total amount of the amount of alkylene oxides used in the activation and copolymerisation) of one or more alkylene oxides is added to the mixture resulting from the preceding activation step, wherein this addition of the partial amount of alkylene oxide can optionally take place in the presence of $CO_2$ but preferably takes place in the absence of $CO_2$, and wherein a waiting period is then observed until the temperature peak ("hotspot") that occurs as a result of the subsequent exothermic chemical reaction, and/or a pressure drop in the reactor occurs, (β3) optionally in a third activation step, or further activation steps, after the temperature peak reached in the preceding activation step, step (β2) is repeated from zero to five times, preferably from one to four times, particularly preferably exactly once, wherein this addition of the partial amount, or these additions of the partial amounts, of alkylene oxide take(s) place in the absence of $CO_2$, and wherein a waiting period is then observed until the temperature peak ("hotspot") that occurs as a result of the subsequent exothermic chemical reaction, and/or a pressure drop in the reactor occurs, (β4) optionally in a further activation step, or further activation steps, after the temperature peak reached in the preceding activation step, step (β3) is repeated from one to five times, preferably from one to four times, particularly preferably exactly once, wherein this addition of the partial amount, or these additions of the partial amounts, of alkylene oxide take(s) place in the presence of $CO_2$, and wherein a waiting time is then observed until the temperature peak ("hotspot") that occurs as a result of the subsequent exothermic chemical reaction, and/or a pressure drop in the reactor occurs.

In a preferred embodiment, the partial amount of one or more alkylene oxides used in steps β1 to β4 is in each case from 2.0 to 15.0 wt. %, preferably from 2.5 to 14.0 wt. %, particularly preferably from 3.0 to 13.0 wt. % (based on the total amount of the amount of alkylene oxides used in the activation and copolymerisation).

The metered addition of one or more alkylene oxides and optionally of the carbon dioxide takes place after drying of a starter substance or of the mixture of a plurality of starter substances and after the addition of the DMC catalyst and/or of the metal salt, which is added in the form of a solid or in the case of the DMC catalyst in the form of a suspension before or after drying of the starter substance. If the DMC catalyst and/or the metal salt is added after drying of the starter substance, the DMC catalyst and/or the metal salt should preferably be dried, for example in an analogous process to the drying of the starter substance. The metered addition of one or more alkylene oxides and of the carbon dioxide can in principle take place in different ways. The start of the metered addition can take place from the vacuum or at a previously chosen preliminary pressure. The preliminary pressure is preferably established by passing in an inert gas such as, for example, nitrogen, the pressure (absolute) being set at from 10 mbar to 10 bar, preferably from 100 mbar to 8 bar and more preferably from 500 mbar to 6 bar. In a particularly preferred embodiment, the mixture of one or more starter compounds and the DMC catalyst resulting from step (α) is subjected at a temperature of from 100° C. to 130° C. at least once, preferably three times, to an inert gas pressure (nitrogen or a noble gas such as, for example, argon) of from 1.5 bar to 10 bar (absolute), particularly preferably from 3 bar to 6 bar (absolute), and immediately thereafter, within a period of up to 15 minutes, the excess pressure is in each case reduced to 1 bar (absolute). Alternatively, in an embodiment which is likewise particularly preferred, inert gas (nitrogen or a noble gas such as, for example, argon) is passed at a temperature of from 40° C. to 130° C. into the mixture of one or more starter compounds and the DMC catalyst resulting from step (α) and at the same time a reduced pressure (absolute) of from 10 mbar to 800 mbar, particularly preferably from 50 mbar to 200 mbar, is applied.

Step (γ):

The metered addition of one or more alkylene oxides and of the carbon dioxide can take place simultaneously or sequentially, it being possible for the entire amount of carbon dioxide to be added at once or in a metered manner over the reaction time. A metered addition of the carbon dioxide is preferably carried out. The metered addition of one or more alkylene oxides takes place simultaneously or sequentially with the metered addition of the carbon dioxide. If a plurality of alkylene oxides are used in the synthesis of the polyether carbonate polyols, then the metered addition thereof can take place simultaneously or sequentially via separate metered additions (additions) or via one or more metered additions, at least two alkylene oxides being metered in as a mixture. Via the nature of the metered addition of the alkylene oxides and of the carbon dioxide it is possible to synthesise random, alternating, block-like or gradient-like polyether carbonate polyols. The concentration of free alkylene oxides during the reaction in the reaction mixture is preferably from >0 to 40 wt. %, particularly preferably from >0 to 25 wt. %, most preferably from >0 to 10 wt. % (in each case based on the weight of the reaction mixture).

Preferably, an excess of carbon dioxide, based on the calculated amount of incorporated carbon dioxide in the polyether carbonate polyol, is used because an excess of carbon dioxide is advantageous due to the slowness of carbon dioxide to react. The amount of carbon dioxide can be established via the total pressure under the reaction conditions in question. The range from 1 to 120 bar, preferably from 50 to 110 bar, particularly preferably from 70 to 100 bar, has been found to be advantageous as the total pressure (absolute) for the copolymerisation for the preparation of the polyether carbonate polyols. For the process according to the invention it has further been shown that the copolymerisation for the preparation of the polyether carbonate polyols is advantageously carried out at from 50 to 150° C., preferably at from 60 to 145° C., particularly preferably at from 70 to 140° C. and most particularly preferably at from 110 to 120° C. If temperatures below 50° C. are set, the reaction comes to a halt. At temperatures above 150° C., the amount of undesirable secondary products increases considerably. It is further to be ensured when choosing the pressure and temperature that the $CO_2$ as far as possible changes from the gaseous state to the liquid and/or supercritical liquid state. $CO_2$ can, however, also be added to the reactor in the form of a solid and then change into the liquid and/or supercritical liquid state under the chosen reaction conditions.

Particularly preferred reactors are: tubular reactor, stirrer vessel and loop reactor. Polyether carbonate polyols can be prepared in a stirrer vessel, the stirrer vessel being cooled, according to the design and mode of operation, via the reactor jacket, internal cooling surfaces and/or cooling surfaces located in a pump circuit. For safety reasons, the content of free epoxide should not exceed 15 wt. % in the reaction mixture of the stirrer vessel (see, for example, WO-A 2004/081082; page 3; line 14). Attention is therefore to be paid particularly to the metering rate of the epoxide both in semi-batch operation, where the product is not removed until the end of the reaction, and in continuous operation, where the product is removed continuously. The metering rate of the epoxide is to be so adjusted that the epoxide reacts completely sufficiently quickly despite the inhibiting effect of the carbon dioxide. It is possible to supply the carbon dioxide continuously or discontinuously. This depends whether the epoxide is consumed quickly enough and whether the product is optionally to contain $CO_2$-free polyether blocks. The amount of carbon dioxide (indicated as pressure) can likewise vary during the addition of the epoxide. It is possible gradually to increase the $CO_2$ pressure during the addition of the epoxide or to lower it or leave it the same.

A further possible embodiment in the stirrer vessel for the copolymerisation (step γ) is characterised in that one or more H-functional starter compounds are metered into the reactor continuously during the reaction, it being possible for the metal salt used to be fed to the process together with the starter or already to be present in its entirety at the beginning of the reaction. The amount of H-functional starter compounds metered into the reactor continuously during the reaction is preferably at least 20 mol % equivalents, particularly preferably from 70 to 95 mol % equivalents (in each case based on the total amount of H-functional starter compounds).

The catalyst/starter mixture activated by this process can be (further) copolymerised with epoxide and carbon dioxide in the stirrer vessel or in a different reaction vessel (tubular reactor or loop reactor).

In the case of a tubular reactor, the activated catalyst and the starter as well as the epoxide and carbon dioxide are pumped continuously through a tube. The molar ratios of the reactants vary according to the polymer that is desired. In a preferred embodiment, carbon dioxide is metered in in its supercritical form, that is to say virtually liquid form, in order to permit better miscibility of the components. There are advantageously fitted mixing elements for better mixing of the reactants, as are marketed, for example, by Ehrfeld Mikrotechnik BTS GmbH, or mixer/heat exchanger elements, which improve mixing and heat dissipation at the same time.

Even loop reactors can be used for the preparation of polyether carbonate polyols. In general, these include reactors with material recycling, such as, for example, a jet loop reactor, which can also be operated continuously, or a loop of tubular reactors. The use of a loop reactor is particularly advantageous because backmixing can be carried out here, so that the epoxide concentration should be low. In order to achieve complete conversion, a tube ("dwell tube") is frequently provided downstream.

The polyether carbonate polyols obtained according to the invention have a functionality of at least 1, preferably from 1 to 8, particularly preferably from 1 to 6 and most particularly preferably from 2 to 4. The molecular weight is preferably from 400 to 20,000 g/mol and particularly preferably from 500 to 10,000 g/mol.

In general, alkylene oxides (epoxides) having from 2 to 24 carbon atoms can be used for the process according to the invention. Alkylene oxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidised fats as mono-, di- and tri-glycerides, epoxidised fatty acids, $C_1$-$C_{24}$-esters of epoxidised fatty acids, epichlorohydrin, glycidol and derivatives of glycidol such as, for example, methyl glycidyl ether, ethyl glycidyl ether, 2-ethylhexyl glycidyl ether, allyl glycidyl ether, glycidyl methacrylate as well as epoxide-functional alkyloxysilanes such as, for example, 3-glycidyloxypropyltrimethoxysilane, 3-glycidyloxypropyltriethoxysilane, 3-glycidyloxypropyltripropoxysilane, 3-glycidyloxypropyl-methyl-dimethoxysilane, 3-glycidyloxypropyl-ethyldiethoxysilane, 3-glycidyloxypropyltriisopropoxysilane. Ethylene oxide and/or propylene oxide, in particular propylene oxide, are preferably used as the alkylene oxides.

There can be used as the suitable H-functional starter substance compounds having H atoms active for the alkoxylation. Groups which have active H atoms and which are active for the alkoxylation are, for example, —OH, —NH$_2$ (primary amines), —NH— (secondary amines), —SH and —CO$_2$H; —OH and —NH$_2$ are preferred; —OH is particularly preferred. There is used as the H-functional starter substance, for example, one or more compounds selected from the group consisting of polyhydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polyethyleneimines, polyether amines (e.g. so-called Jeffamine® from Huntsman, such as, for example, D-230, D-400, D-2000, T-403, T-3000, T-5000 or corresponding products from BASF, such as, for example, polyether amine D230, D400, D200, T403, T5000), polytetrahydrofurans (e.g. PolyTHF® from BASF, such as, for example, PolyTHF® 250, 650S, 1000, 1000S, 1400, 1800, 2000), polytetrahydrofuranamines (BASF product polytetrahydrofuranamine 1700), polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters that contain on average at least 2 OH groups per molecule. The $C_1$-$C_{24}$-alkyl fatty acid esters that contain on average at least 2 OH groups per molecule are, for example, commercial products such as Lupranol Balance® (BASF AG), Merginol® types (Hobum Oleochemicals GmbH), Sovermol® types (Cognis Deutschland GmbH & Co. KG) and Soyol® types (USSC Co.).

There can be used as monofunctional starter compounds alcohols, amines, thiols and carboxylic acids. There can be used as monofunctional alcohols: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. There are suitable as monofunctional amines: butylamine, tert-butylamine, pentylamine, hexylamine, aniline, aziridine, pyrrolidine, piperidine, morpholine. There can be used as monofunctional thiols: ethanethiol, 1-propanethiol, 2-propanethiol, 1-butanethiol, 3-methyl-1-butanethiol, 2-butene-1-thiol, thiophenol. There may be mentioned as monofunctional carboxylic acids: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis-(hydroxymethyl)-cyclohexanes (such as, for example, 1,4-bis-(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalised fats and oils, in particular castor oil), as well as all modification products of the above-mentioned alcohols with different amounts of ε-caprolactone.

The H-functional starter substances can also be selected from the substance class of the polyether polyols, in particular those having a molecular weight Mn in the range from 100 to 4000 g/mol. Preference is given to polyether polyols that are composed of repeating ethylene oxide and propylene oxide units, preferably having a content of from 35 to 100% propylene oxide units, particularly preferably having a content of from 50 to 100% propylene oxide units. These can be random copolymers, gradient copolymers, alternating or block copolymers of ethylene oxide and propylene oxide. Suitable polyether polyols composed of repeating propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (such as, for example, Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands from BASF SE, suitable homo-polypropylene oxides are, for example, the Pluriol® P brands from BASF SE, suitable mixed copolymers of ethylene oxide and propylene oxide are, for example, the Pluronic® PE or Pluriol® RPE brands from BASF SE.

The H-functional starter substances can also be selected from the substance class of the polyester polyols, in particular those having a molecular weight Mn in the range from 200 to 4500 g/mol. At least difunctional polyesters are used as polyester polyols. Polyester polyols preferably consist of alternating acid and alcohol units. There are used as acid components, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the mentioned acids and/or anhydrides. There are used as alcohol components, for example, ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol, trimethylolpropane, glycerol, pentaerythritol or mixtures of the mentioned alcohols. If divalent or polyvalent polyether polyols are used as the alcohol component, polyester ether polyols which can likewise be used as starter substances for the preparation of the polyether carbonate polyols are obtained. Preferably, polyether polyols with Mn=from 150 to 2000 g/mol are used for the preparation of the polyester ether polyols.

Polycarbonate diols can further be used as H-functional starter substances, in particular polycarbonate diols having a molecular weight Mn in the range from 150 to 4500 g/mol, preferably from 500 to 2500 g/mol, which are prepared, for example, by reaction of phosgene, dimethyl carbonate, diethyl carbonate or diphenyl carbonate and difunctional alcohols or polyester polyols or polyether polyols. Examples of polycarbonates are to be found, for example, in EP-A 1359177. For example, there can be used as polycarbonate diols the Desmophen® C types from Bayer MaterialScience AG, such as, for example, Desmophen® C 1100 or Desmophen® C 2200.

In a further embodiment of the invention, polyether carbonate polyols can be used as the H-functional starter substances. In particular, polyether carbonate polyols that are obtainable by the process according to the invention described herein are used. These polyether carbonate polyols used as H-functional starter substances are prepared beforehand in a separate reaction step.

The H-functional starter substances generally have a functionality (i.e. number of H atoms active for the polymerisation per molecule) of from 1 to 8, preferably 2 or 3. The H-functional starter substances are used either individually or in the form of a mixture of at least two H-functional starter substances.

Preferred H-functional starter substances are alcohols of the general formula (IV)

$$\text{HO}-(\text{CH}_2)_x-\text{OH} \quad\quad\quad (IV)$$

wherein x is a number from 1 to 20, preferably an even number from 2 to 20. Examples of alcohols according to formula (IV) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (IV) with ε-caprolactone, for example reaction products of trimethylolpropane with ε-caprolactone, reaction products of glycerol with ε-caprolactone, as well as reaction products of pentaerythritol with ε-caprolactone. Further preferred as H-functional starter substances are water, diethylene glycol, dipropylene glycol, castor oil, sorbitol, and polyether polyols composed of repeating polyalkylene oxide units.

Particularly preferably, the H-functional starter substances are one or more compounds selected from the group consisting of ethylene glycol, propylene glycol, 1,3-propanediol, 1,3-butanediol, 1,4-butanediol, 1,5-pentanediol, 2-methyl-1, 3-propanediol, neopentyl glycol, 1,6-hexanediol, diethylene glycol, dipropylene glycol, glycerol, trimethylolpropane, di- and tri-functional polyether polyols, the polyether polyol being composed of a di- or tri-H-functional starter substance and propylene oxide or of a di- or tri-H-functional starter substance, propylene oxide and ethylene oxide. The polyether polyols preferably have a molecular weight Mn in the range from 62 to 4500 g/mol and a functionality of from 2 to 3, and in particular a molecular weight Mn in the range from 62 to 3000 g/mol and a functionality of from 2 to 3.

The preparation of the polyether carbonate polyols is carried out by catalytic addition of carbon dioxide and alkylene oxides to H-functional starter substances. Within the scope of the invention, "H-functional" is understood as being the number of H atoms active for the alkoxylation per molecule of the starter compound.

DMC catalysts for use in the homopolymerisation of epoxides are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts which are described, for example, in U.S. Pat. No. 5,470,813, EP-A 700 949, EP-A 743 093, EP-A 761 708, WO 97/40086, WO 98/16310 and WO 00/47649 have a very high activity in the homopolymerisation of epoxides and permit the preparation of polyether polyols at very low catalyst concentrations (25 ppm or less), so that separation of the catalyst from the finished product is generally no longer required. A typical example is the highly active DMC catalysts described in EP-A 700 949, which contain, in addition to a double metal cyanide compound (e.g. zinc hexacyanocobaltate(III)) and an organic complex ligand (e.g. tert-butanol), also a polyether having a number-average molecular weight greater than 500 g/mol.

The DMC catalysts according to the invention are obtained by
  (i) in the first step, reacting an aqueous solution of a metal salt with the aqueous solution of a metal cyanide salt in the presence of one or more organic complex ligands, for example an ether or alcohol,
  (ii) wherein in the second step the solid is separated from the suspension obtained from (i) by known techniques (such as centrifugation or filtration),
  (iii) wherein optionally in a third step the isolated solid is washed with an aqueous solution of an organic complex ligand (e.g. by being resuspended and then isolated again by filtration or centrifugation),
  (iv) wherein the resulting solid, optionally after pulverisation, is then dried at temperatures of generally from 20 to 120° C. and at pressures of generally from 0.1 mbar to normal pressure (1013 mbar),
and wherein in the first step or immediately after the precipitation of the double metal cyanide compound (second step), one or more organic complex ligands, preferably in excess (based on the double metal cyanide compound), and optionally further complex-forming components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt such as, for example, potassium hexacyanocobaltate) and potassium hexacyanocobaltate is mixed and then dimethoxyethane (glyme) or tert-butanol (preferably in excess, based on zinc hexacyanocobaltate) is added to the resulting suspension.

Metal salts suitable for the preparation of the double metal cyanide compounds preferably have the general formula (V)

$$M(X)_n \qquad (V)$$

wherein
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, M is preferably $Zn^{2+}$, $Fe^{2+}$, $Co^{2+}$ or $Ni^{2+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate, and
n is 2 when X=halide, hydroxide, carboxylate, cyanate, thiocyanate, isocyanate, isothiocyanate or nitrate,
or suitable metal salts have the general formula (VI)

$$M_r(X)_3 \qquad (VI)$$

wherein
M is selected from the metal cations $Fe^{3+}$, $Al^{3+}$, $Co^{3+}$ and $Cr^{3+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate, and
r is 1 when X=halide, hydroxide, carboxylate, cyanate, thiocyanate, isocyanate, isothiocyanate or nitrate,
or suitable metal salts have the general formula (VII)

$$M(X)_s \qquad (VII)$$

wherein
M is selected from the metal cations $Mo^{4+}$, $V^{4+}$ and $W^{4+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate, and
s is 4 when X=halide, hydroxide, carboxylate, cyanate, thiocyanate, isocyanate, isothiocyanate or nitrate,
or suitable metal salts have the general formula (VIII)

$$M(X)_t \qquad (VIII)$$

wherein
M is selected from the metal cations $Mo^{6+}$ and $W^{6+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate, and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II)

thiocyanate, nickel(II) chloride and nickel(II) nitrate. Mixtures of different metal salts can also be used.

Metal cyanide salts suitable for the preparation of the double metal cyanide compounds preferably have the general formula (IX)

$$(Y)_a M'(CN)_b (A)_c \quad (IX)$$

wherein

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V), M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^{30}$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, the values for a, b and c being so chosen that the electroneutrality of the metal cyanide salt is given; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds which are contained in the DMC catalysts according to the invention are compounds of the general formula (X)

$$M_x[M'_{x'}(CN)_y]_z \quad (X),$$

wherein M is as defined in formulae (III) to (VI) and

M' is as defined in formula (VII), and x, x', y and z are integers and are so chosen that the electroneutrality of the double metal cyanide compound is given.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found, for example, in U.S. Pat. No. 5,158,922 (column 8, lines 29-66). Zinc hexacyanocobaltate(III) is particularly preferably used.

The organic complex ligands added in the preparation of the DMC catalysts are disclosed, for example, in U.S. Pat. No. 5,158,922 (see in particular column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, there are used as organic complex ligands water-soluble, organic compounds with heteroatoms, such as oxygen, nitrogen, phosphorus or sulfur, which are able to form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which contain both aliphatic or cycloaliphatic ether groups and aliphatic hydroxyl groups (such as, for example, ethylene glycol mono-tert-butyl ether, diethylene glycol mono-tert-butyl ether, tripropylene glycol monomethyl ether and 3-methyl-3-oxetan-methanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetan-methanol.

In the preparation of the DMC catalysts according to the invention there are optionally used one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic acid esters of polyhydric alcohols, gallic acids or salts, esters or amides thereof, cyclodextrins, phosphorus compounds, $\alpha,\beta$-unsaturated carboxylic acid esters or ionic surface-active compounds.

In the preparation of the DMC catalysts according to the invention there are preferably reacted in the first step the aqueous solutions of the metal salt (e.g. zinc chloride), used in stoichiometric excess (at least 50 mol %) based on metal cyanide salt, that is to say at least a molar ratio of metal salt to metal cyanide salt of from 2.25 to 1.00, and of the metal cyanide salt (e.g. potassium hexacyanocobaltate) in the presence of the organic complex ligand (e.g. tert-butanol), there being formed a suspension which contains the double metal cyanide compound (e.g. zinc hexacyanocobaltate), water, excess metal salt, and the organic complex ligand.

The organic complex ligand can be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligand with vigorous stirring. Optionally, the suspension formed in the first step is then treated with a further complex-forming component. The complex-forming component is preferably used in a mixture with water and organic complex ligand. A preferred process for carrying out the first step (i.e. the preparation of the suspension) is carried out using a mixing nozzle, particularly preferably using a jet disperser as described in WO-A 01/39883.

In the second step, the solid (i.e. the precursor of the catalyst according to the invention) is isolated from the suspension by known techniques, such as centrifugation or filtration.

In a preferred variant, the isolated solid is then washed in a third process step with an aqueous solution of the organic complex ligand (e.g. by being resuspended and then isolated again by filtration or centrifugation). In this manner, water-soluble secondary products, for example, such as potassium chloride, can be removed from the catalyst according to the invention. Preferably, the amount of organic complex ligand in the aqueous wash solution is from 40 to 80 wt. %, based on the total solution.

Optionally, further complex-forming component, preferably in the range from 0.5 to 5 wt. %, based on the total solution, is added to the aqueous wash solution in the third step.

It is additionally advantageous to wash the isolated solid more than once. Preferably, the solid is washed in a first washing step (iii-1) with an aqueous solution of the unsaturated alcohol (e.g. by being resuspended and then isolated again by filtration or centrifugation) in order thus to remove, for example, water-soluble secondary products, such as potassium chloride, from the catalyst according to the invention. Particularly preferably, the amount of unsaturated alcohol in the aqueous wash solution is from 40 to 80 wt. %, based on the total solution of the first washing step. In the further washing steps (iii-2), either the first washing step is repeated once or several times, preferably from one to three times, or, preferably, a non-aqueous solution, such as, for example, a mixture or solution of unsaturated alcohol and further complex-forming component (preferably in the range from 0.5 to 5 wt. %, based on the total amount of the wash solution of step (iii-2)), is used as the wash solution and the solid is washed therewith once or several times, preferably from one to three times.

The isolated and optionally washed solid is then, optionally after pulverisation, dried at temperatures of generally from 20 to 100° C. and at pressures of generally from 0.1 mbar to normal pressure (1013 mbar).

A preferred process for isolating the DMC catalysts according to the invention from the suspension by filtration, filter cake washing and drying is described in WO-A 01/80994.

The polyether carbonate polyols obtainable by the process according to the invention have a low content of secondary products and can be processed without difficulty, in particular by reaction with di- and/or poly-isocyanates to polyurethanes, in particular flexible polyurethane foams. For polyurethane applications, polyether carbonate polyols based on an H-functional starter compound having a functionality of at least 2 are preferably used. The polyether carbonate polyols obtainable by the process according to the invention can further be used in applications such as washing and cleaning agent formulations, drilling fluids, fuel additives, ionic and non-ionic surfactants, lubricants, process chemicals for paper or textile production, or cosmetic formulations. It is known to the person skilled in the art that, depending on the field of application in question, the polyether carbonate polyols to be used must satisfy particular material properties such as, for example, molecular weight, viscosity, polydispersity, functionality and/or hydroxyl number.

EXAMPLES

The weight- and number-average molecular weight of the resulting polymers was determined by means of gel permeation chromatography (GPC). The procedure according to DIN 55672-1: "Gel permeation chromatography, Part 1—Tetrahydrofuran as elution solvent" was followed. Polystyrene of known molar mass was used for calibration.

The OH number (hydroxyl number) was determined on the basis of DIN 53240-2, but pyridine was used as solvent instead of THF/dichloromethane. Titration was carried out with 0.5 molar ethanolic KOH (end point recognition by means of potentiometry). Castor oil with certified OH number was used as test substance. The indication of the unit in "mg/g" refers to mg [KOH]/g [polyether carbonate polyol].

For indicating the amount of metal salt used, the ratio of the amount of metal salt used to the amount of cobalt used originating from the DMC catalyst is also used. For calculating the amount of cobalt originating from the DMC catalyst, an amount by weight of Co of 11.0 wt. % is used. This was determined by means of X-ray fluorescence analysis. On this basis, 141 mg of DMC catalyst used (prepared according to Example 6 of WO-A 01/80994) contain an amount of cobalt of 0.26 mmol.

The amount of incorporated $CO_2$ in the resulting polyether carbonate polyol, and the ratio of propylene carbonate to polyether carbonate polyol, were determined by means of $^1$H-NMR (Bruker, DPX 400, 400 MHz; pulse program zg30, waiting time d1: 10 s, 64 scans). The sample was dissolved in each case in deuterated chloroform. The relevant resonances in the $^1$H-NMR (based on TMS=0 ppm) are as follows:

cyclic carbonate (which was formed as secondary product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanediol incorporated as starter molecule with a resonance at 1.6 to 1.52 ppm.

The molar amount of carbonate incorporated in the polymer in the reaction mixture is calculated according to formula (XI) as follows, wherein the following abbreviations are used:

F(4.5)=resonance area at 4.5 ppm for cyclic carbonate (corresponds to an H atom)
F(5.1-4.8)=resonance area at 5.1-4.8 ppm for polyether carbonate polyol and an H atom for cyclic carbonate
F(2.4)=resonance area at 2.4 ppm for free, unreacted PO
F(1.2-1.0)=resonance area at 1.2-1.0 ppm for polyether polyol
F(1.6-1.52)=resonance area at 1.6 to 1.52 ppm for 1,8-octanediol (starter)

Taking into account the relative intensities, the polymer-bonded carbonate ("linear carbonate" LC) in the reaction mixture was converted to mol % according to the following formula (XI):

$$LC = \frac{F(5.1-4.8) - F(4.5)}{F(5.1-4.8) + F(2.4) + 0.33*F(1.2-1.0) + 0.25*F(1.6-1.52)} * 100 \quad \text{(XI)}$$

The amount by weight (in wt. %) of polymer-bonded carbonate (LC') in the reaction mixture was calculated according to formula (XII):

$$LC' = \frac{[F(5.1-4.8) - F(4.5)]*102}{N} * 100\% \quad \text{(XII)}$$

wherein the value for N ("denominator" N) is calculated according to formula (XIII):

$$N = [F(5.1-4.8) - F(4.5)]*102 + F(4.5)*102 + F(2.4)*58 + 0.33*F(1.2-1.0)*58 + 0.25*F(1.6-1.52)*146 \quad \text{(XIII)}$$

The factor 102 results from the sum of the molar masses of $CO_2$ (molar mass 44 g/mol) and of propylene oxide (molar mass 58 g/mol), the factor 58 results from the molar mass of propylene oxide, and the factor 146 results from the molar mass of the starter used, 1,8-octanediol.

The amount by weight (in wt. %) of cyclic carbonate (CC') in the reaction mixture was calculated according to formula (XIV):

$$CC' = \frac{F(4.5) * 102}{N} * 100\%  \quad (XIV)$$

wherein the value for N is calculated according to formula (XI).

In order to calculate from the values of the composition of the reaction mixture the composition based on the polymer component (consisting of polyether polyol, which was composed of starter and propylene oxide during the activation steps carried out under $CO_2$-free conditions, and polyether carbonate polyol, composed of starter, propylene oxide and carbon dioxide during the activation steps carried out in the presence of $CO_2$ and during the copolymerisation), the non-polymer constituents of the reaction mixture (i.e. cyclic propylene carbonate as well as any unreacted propylene oxide present) were eliminated by calculation. The amount by weight of the carbonate repeating units in the polyether carbonate polyol was converted to an amount by weight of carbon dioxide by means of the factor $F=44/(44+58)$. The indication of the $CO_2$ content in the polyether carbonate polyol ("incorporated $CO_2$"; see following examples and Table 1) is normalised to the proportion of the polyether carbonate polyol molecule that was formed in the copolymerisation and optionally the activation steps in the presence of $CO_2$ (i.e. the proportion of the polyether carbonate polyol molecule, which results from the starter (1,8-octanediol) and from the reaction of the starter with epoxide, that was added under $CO_2$-free conditions was not taken into account here).

H-functional starter compound used:

1,8-octanediol Sigma Aldrich

Preparation of a polyether carbonate polyol in the presence of a DMC catalyst and in the absence of metal salts. (Example 1; comparison):

141 mg of dried DMC catalyst (prepared according to Example 6 of WO-A 01/80994) and 51 g of dried 1,8-octanediol (starter) were placed in a 1-liter pressurised reactor with a gas-metering device. The reactor was heated to 130° C. and rendered inert by repeated application of nitrogen to about 5 bar and subsequent pressure reduction to about 1 bar. This procedure was carried out at least 3 times [drying]. 25 g of propylene oxide (PO) were metered into the reactor at 130° C. and in the absence of $CO_2$, that is to say at zero bar $CO_2$. The beginning of the reaction was marked by a temperature peak ("hotspot") and by a pressure drop to the starting pressure (about 1 bar) [activation 1]. After the first pressure drop, 20 g of PO [activation 2] and then 19 g of PO [activation 3] were quickly metered in, as a result of which a temperature peak and a pressure drop again occurred in each case. After 50 bar $CO_2$ had been applied to the reactor, 50 g of PO were quickly metered in [activation 4], a temperature peak occurring after a waiting time of 33 minutes. At the same time, the carbon dioxide $CO_2$ pressure started to fall. The pressure was so controlled that fresh $CO_2$ was added when it fell. Only then was the remaining propylene oxide (435 g) pumped continuously into the reactor at about 1.8 g/minute, while the temperature was lowered to 105° C. in steps of 5° C. per five minutes. When the PO addition was complete, stirring (1500 rpm) was carried out for a further 60 minutes at 105° C. and the pressure indicated above.

The polyether carbonate polyol so prepared is distinguished by the following properties:

incorporated $CO_2$ [wt. %], based on the portion of the polymer formed under $CO_2$: 19.9 wt. %; selectivity, indicated as the ratio of cyclic carbonate (undesirable secondary product) to polyether carbonate polyol=0.21; the OH number of the polyether carbonate polyol was 67.2 mg/g; polydispersity 1.45.

Preparation of a polyether carbonate polyol in the presence of a DMC catalyst and of a metal salt (general preparation procedure):

141 mg of dried DMC catalyst (prepared according to EP-A 700949), a metal salt of the type indicated in Table 1, and 51 g of dried 1,8-octanediol (starter) were placed in a 1-liter pressurised reactor with a gas-metering device. The reactor was heated to 130° C. and rendered inert by repeated application of nitrogen to about 5 bar and subsequent pressure reduction to about 1 bar. This procedure was carried out at least 3 times [drying]. The reaction mixture can optionally also be rendered inert by means of $N_2$ stripping. 25 g of propylene oxide (PO) were metered into the reactor at 130° C. and in the absence of $CO_2$, that is to say at zero bar $CO_2$. The beginning of the reaction was marked by a temperature peak ("hotspot") and by a pressure drop to the starting pressure (about 1 bar) [activation 1]. After the first pressure drop, 20 g of PO [activation 2] and then 19 g of PO [activation 3] were quickly metered in, as a result of which a temperature peak and a pressure drop again occurred in each case. After 50 bar $CO_2$ had been applied to the reactor, 50 g of PO were quickly metered in [activation 4], a temperature peak occurring after a waiting time of 33 minutes. At the same time, the carbon dioxide $CO_2$ pressure started to fall. The pressure was so controlled that fresh $CO_2$ was added when it fell. Only then was the remaining propylene oxide (435 g) pumped continuously into the reactor at about 1.8 g/minute, while the temperature was lowered to 105° C. in steps of 5° C. per five minutes. When the PO addition was complete, stirring (1500 rpm) was carried out for a further 60 minutes at 105° C. and the pressure indicated above.

Preparation of a polyether carbonate polyol in the presence of 49 g of calcium chloride (Example 2, according to the invention):

The procedure was carried out according to the general preparation procedure indicated above, there being placed in the reaction vessel calcium chloride as metal salt together with catalyst and 1,8-octanediol (starter) as solid.

The time to the hotspot under $CO_2$ [activation 4] was 27 minutes.

The polyether carbonate polyol so prepared is distinguished by the following properties:

The incorporated $CO_2$ [wt. %], based on the portion of the polymer formed under $CO_2$, was 21.3 wt. %;

The selectivity, indicated as the ratio of cyclic carbonate (undesirable secondary product) to polyether carbonate polyol, was 0.14;

The OH number of the polyether carbonate polyol was 65.5 mg/g;

The polydispersity was 1.48.

Preparation of a polyether carbonate polyol in the presence of 141 mg of calcium chloride (Example 3, according to the invention):

The procedure was carried out according to the general preparation procedure indicated above, there being placed in the reaction vessel calcium chloride as metal salt together with catalyst and 1,8-octanediol (starter) as solid.

The time to the hotspot under $CO_2$ [activation 4] was 49 minutes.

The polyether carbonate polyol so prepared is distinguished by the following properties:

The incorporated $CO_2$ [wt. %], based on the portion of the polymer formed under $CO_2$, was 23.1 wt. %;

The selectivity, indicated as the ratio of cyclic carbonate (undesirable secondary product) to polyether carbonate polyol, was 0.14;

The OH number of the polyether carbonate polyol was 63.3 mg/g;

The polydispersity was 1.72.

Preparation of a polyether carbonate polyol in the presence of 42 mg of magnesium chloride (Example 4, according to the invention):

The procedure was carried out according to the general preparation procedure indicated above, there being placed in the reaction vessel magnesium chloride as metal salt together with catalyst and 1,8-octanediol (starter) as solid.

The time to the hotspot under $CO_2$ [activation 4] was 24 minutes.

The polyether carbonate polyol so prepared is distinguished by the following properties:

The incorporated $CO_2$ [wt. %], based on the portion of the polymer formed under $CO_2$, was 21.6 wt. %;

The selectivity, indicated as the ratio of cyclic carbonate (undesirable secondary product) to polyether carbonate polyol, was 0.14;

The OH number of the polyether carbonate polyol was 65.5 mg/g;

The polydispersity was 1.48.

Preparation of a polyether carbonate polyol in the presence of 141 mg of magnesium chloride (Example 5, according to the invention):

The procedure was carried out according to the general preparation procedure indicated above, there being placed in the reaction vessel magnesium chloride as metal salt together with catalyst and 1,8-octanediol (starter) as solid.

The time to the hotspot under $CO_2$ [activation 4] was 58 minutes.

The polyether carbonate polyol so prepared is distinguished by the following properties:

The incorporated $CO_2$ [wt. %], based on the portion of the polymer formed under $CO_2$, was 23.3 wt. %;

The selectivity, indicated as the ratio of cyclic carbonate (undesirable secondary product) to polyether carbonate polyol, was 0.14;

The OH number of the polyether carbonate polyol was 67.4 mg/g;

The polydispersity was 1.45 on 1.72.

Preparation of a polyether carbonate polyol in the presence of 260 mg of magnesium distearate (Example 6, according to the invention):

The procedure was carried out according to the general preparation procedure indicated above, there being placed in the reaction vessel magnesium distearate (magnesium stearate) as metal salt together with catalyst and 1,8-octanediol (starter) as solid.

The time to the hotspot under $CO_2$ [activation 4] was shortened from 33 minutes to 18 minutes.

The polyether carbonate polyol so prepared is distinguished by the following properties:

The incorporated $CO_2$ [wt. %], based on the portion of the polymer formed under $CO_2$, was 21.4 wt. %;

The selectivity, indicated as the ratio of cyclic carbonate (undesirable secondary product) to polyether carbonate polyol, was 0.14;

The OH number of the polyether carbonate polyol was 64.5 mg/g;

The polydispersity was 1.61.

Preparation of a polyether carbonate polyol in the presence of 390 mg of aluminium tristearate (Example 7, according to the invention):

The procedure was carried out according to the general preparation procedure indicated above, there being placed in the reaction vessel aluminium tristearate (aluminium stearate) as metal salt together with catalyst and 1,8-octanediol (starter) as solid.

The time to the hotspot under $CO_2$ [activation 4] was 19 minutes.

The polyether carbonate polyol so prepared is distinguished by the following properties:

The incorporated $CO_2$ [wt. %], based on the portion of the polymer formed under $CO_2$, was 23.1 wt. %;

The selectivity, indicated as the ratio of cyclic carbonate (undesirable secondary product) to polyether carbonate polyol, was 0.15;

The OH number of the polyether carbonate polyol was 63.3 mg/g;

The polydispersity was 1.86.

Preparation of a polyether carbonate polyol in the presence of 65 mg of dried magnesium acetate (Example 8, according to the invention):

The procedure was carried out according to the general preparation procedure indicated above, there being placed in the reaction vessel magnesium acetate as metal salt together with catalyst and 1,8-octanediol (starter) as solid.

The time to the hotspot under $CO_2$ [activation 4] was shortened from 33 minutes to 16 minutes.

The polyether carbonate polyol so prepared is distinguished by the following properties:

The incorporated $CO_2$ [wt. %], based on the portion of the polymer formed under $CO_2$, was 20.7 wt. %;

The selectivity, indicated as the ratio of cyclic carbonate (undesirable secondary product) to polyether carbonate polyol, was 0.14;

The OH number of the polyether carbonate polyol was 62.2 mg/g;

The polydispersity was 1.43.

Preparation of a polyether carbonate polyol in the presence of 270 mg of dried calcium stearate (Example 9, according to the invention):

The procedure was carried out according to the general preparation procedure indicated above, there being placed in the reaction vessel calcium stearate as metal salt together with catalyst and 1,8-octanediol (starter) as solid.

The time to the hotspot under $CO_2$ [activation 4] was shortened from 33 minutes to 15 minutes.

The polyether carbonate polyol so prepared is distinguished by the following properties:

The incorporated $CO_2$ [wt. %], based on the portion of the polymer formed under $CO_2$, was 20.3 wt. %;

The selectivity, indicated as the ratio of cyclic carbonate (undesirable secondary product) to polyether carbonate polyol, was 0.12;

The OH number of the polyether carbonate polyol was 62.9 mg/g;

The polydispersity was 1.31.

Preparation of a polyether carbonate polyol in the presence of 405 mg of dried calcium stearate (Example 10, according to the invention):

The procedure was carried out according to the general preparation procedure indicated above, there being placed in the reaction vessel calcium stearate as metal salt together with catalyst and 1,8-octanediol (starter) as solid.

The time to the hotspot under $CO_2$ [activation 4] was shortened from 33 minutes to 15 minutes.

The polyether carbonate polyol so prepared is distinguished by the following properties:

The incorporated $CO_2$ [wt. %], based on the portion of the polymer formed under $CO_2$, was 20.2 wt. %;

The selectivity, indicated as the ratio of cyclic carbonate (undesirable secondary product) to polyether carbonate polyol, was 0.10;

The OH number of the polyether carbonate polyol was 64.3 mg/g;

The polydispersity was 1.47.

Preparation of a polyether carbonate polyol in the presence of 280 mg of zinc distearate (Example 11, comparison, not according to the invention):

The procedure was carried out according to the general preparation procedure indicated above, there being placed in the reaction vessel zinc distearate (zinc stearate) as metal salt together with catalyst and 1,8-octanediol (starter) as solid.

The time to the hotspot under $CO_2$ [activation 4] was 55 minutes.

The polyether carbonate polyol so prepared is distinguished by the following properties:

The incorporated $CO_2$ [wt. %], based on the portion of the polymer formed under $CO_2$, was 19.0 wt. %;

The selectivity, indicated as the ratio of cyclic carbonate (undesirable secondary product) to polyether carbonate polyol, was 0.23;

The OH number of the polyether carbonate polyol was 66.4 mg/g;

The polydispersity was 1.47.

Preparation of a polyether carbonate polyol in the presence of 36 mg of zinc oxide (Example 12, comparison example):

The procedure was carried out according to the general preparation procedure indicated above, there being placed in the reaction vessel zinc oxide as metal salt together with catalyst and 1,8-octanediol (starter) as solid.

The time to the hotspot under $CO_2$ [activation 4] was 34 minutes.

The polyether carbonate polyol so prepared is distinguished by the following properties:

The incorporated $CO_2$ [wt. %], based on the portion of the polymer formed under $CO_2$, was 20.0 wt. %;

The selectivity, indicated as the ratio of cyclic carbonate (undesirable secondary product) to polyether carbonate polyol, was 0.19;

The OH number of the polyether carbonate polyol was 67.9 mg/g;

The polydispersity was 1.52.

Preparation of a polyether carbonate polyol in the presence of 60 mg of zinc chloride (Example 13, comparison example):

The procedure was carried out according to the general preparation procedure indicated above, there being placed in the reaction vessel zinc chloride as metal salt together with catalyst and 1,8-octanediol (starter) as solid.

The time to the hotspot under $CO_2$ [activation 4] was 59 minutes.

The polyether carbonate polyol so prepared is distinguished by the following properties:

The incorporated $CO_2$ [wt. %], based on the portion of the polymer formed under $CO_2$, was 18.6 wt. %;

The selectivity, indicated as the ratio of cyclic carbonate (undesirable secondary product) to polyether carbonate polyol, was 0.26;

The OH number of the polyether carbonate polyol was 71.0 mg/g;

The polydispersity was 1.40.

Preparation of a polyether carbonate polyol in the presence of 58 mg of aluminium trichloride (Example 14, comparison example):

The procedure was carried out according to the general preparation procedure indicated above, there being placed in the reaction vessel aluminium trichloride as metal salt together with catalyst and 1,8-octanediol (starter) as solid.

No hotspot under $CO_2$ [activation 4] was observed within 165 minutes. The test was terminated.

Preparation of a polyether carbonate polyol in the presence of 98 mg of magnesium perchlorate (Example 15, comparison example):

The procedure was carried out according to the general preparation procedure indicated above, there being placed in the reaction vessel magnesium perchlorate as metal salt together with catalyst and 1,8-octanediol (starter) as solid.

The time to the hotspot under $CO_2$ [activation 4] was 80 minutes. During the continuous metered addition of PO under 50 bar $CO_2$, a greatly increased value of 65% free PO was determined. The test was therefore terminated.

Preparation of a polyether carbonate polyol in the presence of 53 mg of magnesium sulfate (Example 16, comparison example):

The procedure was carried out according to the general preparation procedure indicated above, there being placed in the reaction vessel magnesium sulfate as metal salt together with catalyst and 1,8-octanediol (starter) as solid.

The time to the hotspot under $CO_2$ [activation 4] was 22 minutes.

The polyether carbonate polyol so prepared is distinguished by the following properties:

The incorporated $CO_2$ [wt. %], based on the portion of the polymer formed under $CO_2$, was 19.5 wt. %;

The selectivity, indicated as the ratio of cyclic carbonate (undesirable secondary product) to polyether carbonate polyol, remained the same (0.21);

The OH number of the polyether carbonate polyol was 68.5 mg/g;

The polydispersity was 1.36.

Preparation of a polyether carbonate polyol in the presence of 62 mg of sodium sulfate (Example 17, comparison example):

The procedure was carried out according to the general preparation procedure indicated above, there being placed in the reaction vessel sodium sulfate as metal salt together with catalyst and 1,8-octanediol (starter) as solid.

The time to the hotspot under $CO_2$ [activation 4] was 27 minutes.

The polyether carbonate polyol so prepared is distinguished by the following properties:

The incorporated $CO_2$ [wt. %], based on the portion of the polymer formed under $CO_2$, was 19.7 wt. %;

The selectivity, indicated as the ratio of cyclic carbonate (undesirable secondary product) to polyether carbonate polyol, was 0.18;

The OH number of the polyether carbonate polyol was 68.4 mg/g;

The polydispersity was 1.38.

Preparation of a polyether carbonate polyol in the presence of 125 mg of stearic acid (Example 18, comparison example):

The procedure was carried out according to the general preparation procedure indicated above, there being placed in the reaction vessel stearic acid as metal salt together with catalyst and 1,8-octanediol (starter) as solid.

The time to the hotspot under $CO_2$ [activation 4] was 29 minutes.

The polyether carbonate polyol so prepared is distinguished by the following properties:

The incorporated $CO_2$ [wt. %], based on the portion of the polymer formed under $CO_2$, was 20.4 wt. %;

The selectivity, indicated as the ratio of cyclic carbonate (undesirable secondary product) to polyether carbonate polyol, was 0.20;

The OH number of the polyether carbonate polyol was 65.5 mg/g;

The polydispersity was 1.42.

Preparation of a polyether carbonate polyol in the presence of 51 mg of sodium phenolate (Example 19, comparison example):

The procedure was carried out according to the general preparation procedure indicated above, there being placed in the reaction vessel sodium phenolate as metal salt together with catalyst and 1,8-octanediol (starter) as solid.

No hotspot under $CO_2$-free conditions [activation 1] was observed within 70 minutes. The addition of a further amount of PO analogously [activation 2] likewise did not result in activation of the catalyst.

The test was terminated.

Preparation of a polyether carbonate polyol in the presence of 190 mg of tetraphenylphosphonium phenolate (Example 20, comparison example):

The procedure was carried out according to the general preparation procedure indicated above, there being placed in the reaction vessel tetraphenylphosphonium phenolate as metal salt together with catalyst and 1,8-octanediol (starter) as solid.

The time to the hotspot under $CO_2$ [activation 4] was 29 minutes.

The polyether carbonate polyol so prepared is distinguished by the following properties:

The incorporated $CO_2$ [wt. %], based on the portion of the polymer formed under $CO_2$, was 20.0 wt. %;

The selectivity, indicated as the ratio of cyclic carbonate (undesirable secondary product) to polyether carbonate polyol, was 0.20;

The OH number of the polyether carbonate polyol was 65.5 mg/g;

The polydispersity was 1.28.

Preparation of a polyether carbonate polyol in the presence of 19 mg of lithium chloride (Example 21, comparison, not according to the invention):

The procedure was carried out according to the general preparation procedure indicated above, there being placed in the reaction vessel lithium chloride as metal salt together with catalyst and 1,8-octanediol (starter) as solid.

No hotspot under $CO_2$ [activation 4] was observed within 140 minutes. The test was terminated.

Preparation of a polyether carbonate polyol in the presence of 135 mg of sodium stearate (Example 22, comparison, not according to the invention):

The procedure was carried out according to the general preparation procedure indicated above, there being placed in the reaction vessel sodium stearate as metal salt together with catalyst and 1,8-octanediol (starter) as solid.

No hotspot under $CO_2$ [activation 4] was observed within 120 minutes. The test was terminated.

Preparation of a polyether carbonate polyol in the presence of 300 mg of tin (di)stearate (Example 23, comparison example):

The procedure was carried out according to the general preparation procedure indicated above, there being placed in the reaction vessel tin stearate as metal salt together with catalyst and 1,8-octanediol (starter) as solid.

No hotspot under $CO_2$ [activation 4] was observed within 120 minutes. The test was terminated.

The results of the polyether carbonate polyol preparation are summarised in Table 1.

Zinc compounds such as zinc stearate, zinc oxide or zinc chloride did not result in an increased incorporation of $CO_2$ into the polymer (see Comparison Examples 11 to 13). Activation of the catalyst in the presence of carbon dioxide could not be achieved with the chlorides of aluminium and lithium (see Comparison Examples 14 and 21).

The alkaline earth chlorides such as magnesium chloride or calcium chloride, on the other hand, surprisingly increased the incorporation of carbon dioxide into the polymer and at the same time improve the selectivity (see Examples 2 to 5) as compared with Comparison Example 1, in which no metal salt was added. Magnesium stearate, magnesium acetate and aluminium stearate increased the $CO_2$ content in the polymer, improved the selectivity and shortened the activation time (Examples 6 to 8). With calcium stearate as the metal salt, the optimal combination of increased $CO_2$ content in the polymer, improved selectivity, shortened activation time and reduced polydispersity could be achieved (Examples 9 and 10).

Magnesium perchlorate had such an adverse effect on the catalyst that it was not possible to prepare the polymer successfully (Comparison Example 15). With other metal salts such as magnesium or sodium sulfate, although it was possible to achieve copolymerisation, these metal salts did not lead to increased incorporation of $CO_2$ into the polymer (see Comparison Examples 16 and 17). With sodium phenolate, activation of the catalyst in the presence of carbon dioxide was not achieved (Comparison Example 19), and with tetraphenylphosphonium phenolate, the selectivity was not improved (Comparison Example 20).

Stearic acid had only a slightly positive influence on the incorporation of carbon dioxide into the polymer, but the selectivity was adversely affected (Comparison Example 18). With metal salts such as sodium stearate or tin(II) stearate, it was not possible to achieve activation under carbon dioxide (Comparison Examples 22 and 23).

TABLE 1

Results of the polyether carbonate polyol preparation

| Example | Metal salt | Metal salt [mmol] | [mmol metal salt]/ [mmol Co] | Time 1 [min] | $CO_2$ incorporation [wt. %] | Selectivity cyclic/linear | OH number [mg KOH/g] | Poly- dispersity |
|---|---|---|---|---|---|---|---|---|
| 1 (comp.) | — | — | — | 33 | 19.9 | 0.21 | 67.2 | 1.45 |
| 2 | Calcium chloride | 0.44 | 1.67 | 27 | 21.3 | 0.14 | 65.5 | 1.48 |
| 3 | Calcium chloride | 1.27 | 4.82 | 49 | 23.1 | 0.14 | 63.3 | 1.72 |
| 4 | Magnesium chloride | 0.44 | 1.67 | 24 | 21.6 | 0.14 | 65.5 | 1.48 |
| 5 | Magnesium chloride | 1.48 | 5.62 | 58 | 23.3 | 0.14 | 67.4 | 1.72 |
| 6 | Magnesium stearate | 0.44 | 1.67 | 18 | 21.4 | 0.14 | 64.5 | 1.61 |

TABLE 1-continued

Results of the polyether carbonate polyol preparation

| Example | Metal salt | Metal salt [mmol] | [mmol metal salt]/ [mmol Co] | Time 1 [min] | CO2 incorporation [wt. %] | Selectivity cyclic/linear | OH number [mg KOH/g] | Poly- dispersity |
|---|---|---|---|---|---|---|---|---|
| 7 | Aluminium stearate | 0.44 | 1.67 | 19 | 23.1 | 0.15 | 63.3 | 1.86 |
| 8 | Magnesium acetate | 0.44 | 1.67 | 16 | 20.7 | 0.14 | 62.2 | 1.43 |
| 9 | Calcium stearate | 0.44 | 1.67 | 15 | 20.3 | 0.12 | 62.9 | 1.31 |
| 10 | Calcium stearate | 0.67 | 2.54 | 15 | 20.2 | 0.10 | 64.3 | 1.37 |
| 11 (comp.) | Zinc stearate | 0.44 | 1.67 | 55 | 19.0 | 0.23 | 66.4 | 1.47 |
| 12 (comp.) | Zinc oxide | 0.44 | 1.67 | 34 | 20.0 | 0.19 | 67.9 | 1.52 |
| 13 (comp.) | Zinc chloride | 0.44 | 1.67 | 59 | 18.6 | 0.26 | 71.0 | 1.40 |
| 14 (comp.) | Aluminium chloride | 0.44 | 1.67 | 165 | no activation under $CO_2$ within two hours | | | |
| 15 (comp.) | Magnesium perchlorate | 0.44 | 1.67 | 80 | accumulation of PO, therefore test terminated | | | |
| 16 (comp.) | Magnesium sulfate | 0.44 | 1.67 | 22 | 19.5 | 0.21 | 68.5 | 1.36 |
| 17 (comp.) | Sodium sulfate | 0.44 | 1.67 | 27 | 19.7 | 0.18 | 68.4 | 1.38 |
| 18 (comp.) | Stearic acid | 0.44 | 1.67 | 29 | 20.4 | 0.20 | 65.5 | 1.42 |
| 19 (comp.) | Sodium phenolate | 0.44 | 1.67 | no activation under $CO_2$ free conditions within 70 minutes | | | | |
| 20 (comp.) | Tetraphenylphosphonium phenolate | 0.44 | 1.67 | 29 | 20.0 | 0.20 | 65.5 | 1.28 |
| 21 (comp.) | Lithium chloride | 0.44 | 1.67 | no activation under $CO_2$ within 140 minutes | | | | |
| 22 (comp.) | Sodium stearate | 0.44 | 1.67 | no activation under $CO_2$ within two hours | | | | |
| 23 (comp.) | Tin distearate | 0.44 | 1.67 | no activation under $CO_2$ within two hours | | | | | comp. = comparison example

The invention claimed is:

1. A process for preparing a polyether carbonate polyol from one or more H-functional starter substances, one or more alkylene oxides and carbon dioxide in the presence of a double metal cyanide catalyst and in the presence of at least one metal salt, comprising
   (α) placing the double metal cyanide catalyst, the metal salt and the H-functional starter substance, or a mixture of at least two H-functional starter substances, in a reaction vessel,
   (β) for activation
   (β1) in a first activation step, adding a first partial amount (based on the total amount of the amount of alkylene oxides used in the activation and copolymerisation) of one or more alkylene oxides to the mixture resulting from step (a), wherein this addition of the partial amount of alkylene oxide can optionally take place in the presence of $CO_2$,
   (β2) in a second activation step, after the temperature peak reached in the preceding activation step, adding a second partial amount (based on the total amount of the amount of alkylene oxides used in the activation and copolymerisation) of one or more alkylene oxides to the mixture resulting from the preceding activation step, wherein this addition of the partial amount of alkylene oxide can optionally take place in the presence of $CO_2$, and
   (γ) adding one or more alkylene oxides and carbon dioxide to the mixture resulting from step (β) ("copolymerisation"),
wherein the metal salt comprises at least one compound selected from the group consisting of alkaline earth halides, alkaline earth carboxylates and aluminium carboxylates, and wherein the amount of the metal salt is from 0.2 to 10.0 [mmol metal salt]/[mmol Co] or wherein the metal salt comprises magnesium halide in an amount of from 0.8 to 4.0 [mmol metal salt]/[mmol Co], alkaline earth carboxylate and/or aluminium carboxylate.

2. The process according to claim 1, wherein the copolymerisation is carried out under a total pressure (absolute) of from 50 to 110 bar.

3. The process according to claim 1, wherein for the activation
   (β3) in a third activation step, or further activation steps, after the temperature peak reached in the preceding activation step, step (β2) is repeated from one to five times, wherein this addition of the partial amount, or these additions of the partial amounts, of alkylene oxide take(s) place in the absence of $CO_2$.

4. The process according to claim 3, wherein for the activation
   (β4) in a further activation step, or further activation steps, after the temperature peak reached in the preceding activation step, step (β3) is repeated from one to five times, wherein this addition of the partial amount, or these additions of the partial amounts, of alkylene oxide take(s) place in the presence of $CO_2$.

5. The process according to claim 4, the process comprising:
   (α) placing the double metal cyanide catalyst, at least one metal salt and the H-functional starter substance, or a mixture of at least two H-functional starter substances, in a reaction vessel,
   (β) for activation
   (β1) in a first activation step, adding a first partial amount (based on the total amount of the amount of alkylene oxides used in the activation and copolymerisation) of one or more alkylene oxides to the mixture resulting from step (α), wherein this addition of the partial amount of alkylene oxide takes place in the absence of $CO_2$,
   (β2) in a second activation step, after the temperature peak reached in the preceding activation step, adding a second partial amount (based on the total amount of the amount of alkylene oxides used in the activation and copolymerisation) of one or more alkylene oxides to the mixture resulting from the preceding activation step, wherein this addition of the partial amount of alkylene oxide takes place in the absence of $CO_2$,
   (β3) in a third activation step, after the temperature peak reached in the preceding activation step, step (β2) is repeated exactly once, wherein this addition of the partial amount, or these additions of the partial amounts, of alkylene oxide take(s) place in the absence of $CO_2$, (β4) in a further activation step, or further activation steps, after the temperature peak reached in the preceding activation step, step (β3) is repeated exactly once, wherein this addition of the partial amount, or these additions of the partial amounts, of alkylene oxide take(s) place in the presence of $CO_2$, (γ) adding one or more alkylene oxides and carbon dioxide to the mixture resulting from step (β) ("copolymerisation").

6. The process according to claim 1, comprising (α) placing the H-functional starter substance, or a mixture of at least two H-functional starter substances, in a reaction vessel and removing water and/or other readily volatile compounds by elevated temperature and/or reduced pressure ("drying"), wherein the double metal cyanide catalyst and/or at least one metal salt is added to the H-functional starter substance, or to the mixture of at least two H-functional starter substances, before or after the drying.

7. The process according to claim 1, wherein the partial amount of one or more alkylene oxides used in steps β1 to β4 is in each case from 2.0 to 15.0 wt. % (based on the total amount of the amount of alkylene oxides used in the activation and copolymerisation).

8. The process according to claim 1, wherein the metal salt comprises calcium carboxylate.

9. The process according to claim 1, wherein the H-functional starter substances are selected from at least one of the group consisting of water, alcohols, amines, thiols, aminoalcohols, thioalcohols, hydroxy esters, polyether polyols, polyester polyols, polyester ether polyols, polycarbonate polyols, polyether carbonate polyols, polyethyleneimines, polyether amines, polytetrahydrofurans, polyether thiols, polyacrylate polyols, castor oil, the mono- or di-glyceride of ricinoleic acid, monoglycerides of fatty acids, chemically modified mono-, di- and/or tri-glycerides of fatty acids, and C1-C24-alkyl fatty acid esters that contain on average at least 2 OH groups per molecule.

10. The process according to claim 1, wherein the double metal cyanide catalyst contains at least one double metal cyanide compound selected from the group consisting of zinc hexacyanocobaltate(III), zinc hexacyanoiridate(III), zinc hexacyanoferrate(III) and cobalt(II) hexacyanocobaltate(III).

11. The process according to claim 10, wherein the double metal cyanide catalyst additionally contains at least one organic complex ligand selected from the group consisting of aliphatic ether, ethanol, isopropanol, n-butanol, isobutanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether and 3-methyl-3-oxetan-methanol.

12. The process according to claim 1, which is carried out in a tubular reactor, stirrer vessel or loop reactor.

13. A polyether carbonate polyol obtainable by the process according to claim 1.

* * * * *